US009975309B2

(12) United States Patent
Patel et al.

(10) Patent No.: US 9,975,309 B2
(45) Date of Patent: May 22, 2018

(54) ADJUSTABLE INSERT FOR SANDWICH STRUCTURES

(71) Applicant: SPS TECHNOLOGIES, LLC, Jenkintown, PA (US)

(72) Inventors: Nilesh Patel, Irvine, CA (US); Ismael Pacheco, Mission Viejo, CA (US)

(73) Assignee: SPS TECHNOLOGIES, LLC, Jenkintown, PA (US)

( * ) Notice: Subject to any disclaimer, the term of this patent is extended or adjusted under 35 U.S.C. 154(b) by 18 days.

(21) Appl. No.: 15/267,931

(22) Filed: Sep. 16, 2016

(65) Prior Publication Data
US 2017/0080674 A1    Mar. 23, 2017

Related U.S. Application Data

(60) Provisional application No. 62/220,170, filed on Sep. 17, 2015, provisional application No. 62/256,954, filed on Nov. 18, 2015, provisional application No. 62/267,371, filed on Dec. 15, 2015.

(51) Int. Cl.
| | |
|---|---|
| *B32B 3/06* | (2006.01) |
| *B32B 3/12* | (2006.01) |
| *B32B 3/26* | (2006.01) |
| *B32B 3/30* | (2006.01) |
| *F16B 5/01* | (2006.01) |

(52) U.S. Cl.
CPC ............... *B32B 3/12* (2013.01); *B32B 3/266* (2013.01); *B32B 3/30* (2013.01); *F16B 5/01* (2013.01); *B32B 2250/40* (2013.01); *B32B 2305/34* (2013.01)

(58) Field of Classification Search
CPC ..... Y10T 428/24008; Y10T 16/05; F16B 5/01
See application file for complete search history.

(56) References Cited

FOREIGN PATENT DOCUMENTS

| | | |
|---|---|---|
| GB | 2017857 | 10/1979 |
| GB | 2210403 | 6/1989 |

OTHER PUBLICATIONS

ISR of PCT/US2016/052203 dated Nov. 23, 2016.

*Primary Examiner* — Alexander Thomas
(74) *Attorney, Agent, or Firm* — Burris Law, PLLC

(57) ABSTRACT

An insert for use in a sandwich-type structure, such as a honeycomb panel, is provided that includes a plug and a sleeve. The sleeve includes a plurality of resilient beams, and when the plug is inserted into the sleeve, the resilient beams are elastically deflected by an exterior surface of a wall of the plug such that the insert is adjustable in height and can be positioned properly in an axial/insertion direction to accommodate sandwich-type structures of varying thickness. The result is an insert that maintains a flush profile with both opposing face sheets of the sandwich-type structure, thus reducing discontinuities in surface profile of the overall assembly.

20 Claims, 16 Drawing Sheets

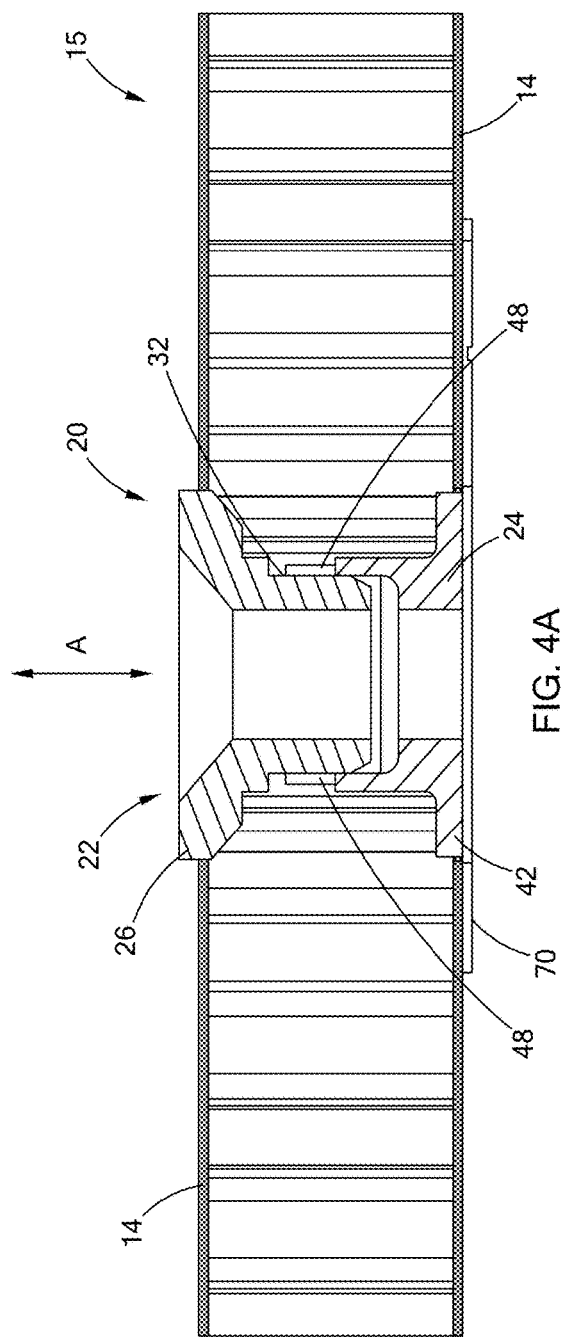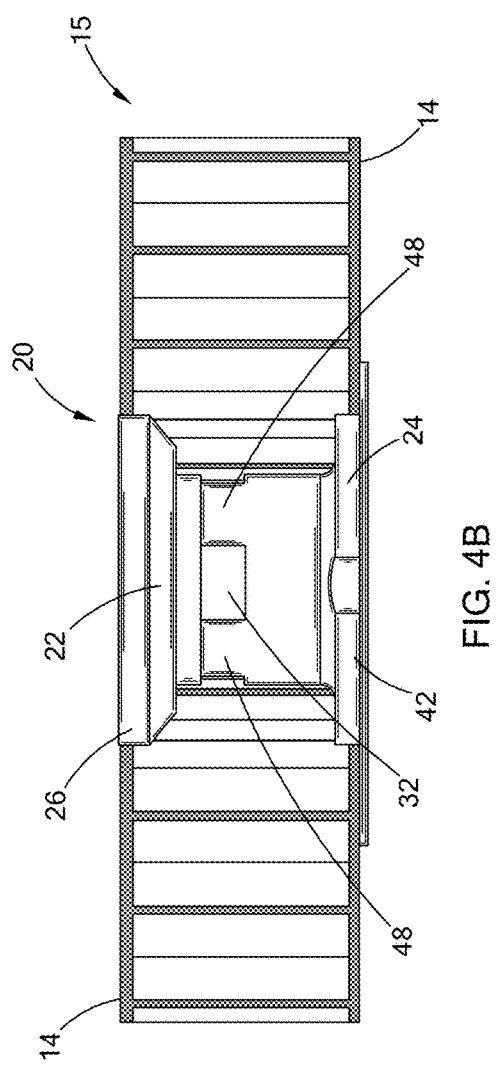

ADJUSTABLE INSERT FOR SANDWICH STRUCTURES

CROSS-REFERENCE TO RELATED APPLICATIONS

This application claims the benefit of provisional patent application Ser. No. 62/220,170 filed on Sep. 17, 2015, provisional patent application Ser. No. 62/256,954 filed on Nov. 18, 2015, and provisional patent application Ser. No. 62/267,371 filed on Dec. 15, 2015. The disclosures of the above applications are incorporated herein by reference.

FIELD

The present disclosure relates to fasteners and more specifically to inserts for use in sandwich-type structures such as honeycomb panels.

BACKGROUND

The statements in this section merely provide background information related to the present disclosure and may not constitute prior art.

Sandwich-type structures, such as honeycomb panels, are used in a variety of applications that require lightweight combined with high strength. Sandwich-type structures generally include a lightweight core with face sheets or skins secured on opposite sides of the core. One such application for sandwich-type structures is in aircraft, and more specifically interior panels of an aircraft such as flooring.

These interior panels are generally secured to the aircraft and/or adjacent components through the use of a specialized fastener generally referred to as an insert. An insert is installed through the core and face sheets in order to provide a location for attaching adjacent components and for transferring associated structural loads. One such example is illustrated in FIG. 1, which shows a mechanical insert 10 installed through a core 12 and face sheets 14 through a thickness "T" of the overall assembly.

Due to inherent manufacturing variation, the overall thickness T of the assembly varies as the core thickness or profile varies, and also as the thickness and profile of each face sheet varies. Additionally, the face sheets are often bonded to the core with an adhesive, and variations in adhesive thickness can also contribute to overall thickness variation of the assembly. When the thickness of the assembly varies, the insert may not be flush with the face sheets on the exterior surfaces of the panel, which can cause stress concentrations and negatively impact the appearance of the panel. If the insert extends above a face sheet, this is known as an "over-flush" condition, which also causes rework because the insert is often subjected to grinding in order to achieve a flush interface between the insert and the face sheet. If the insert is recessed below the face sheet, this is known as an "under-flush" condition, in which the rework often involves drilling out the insert and re-installing an oversize insert. Such rework adds to costs and manufacturing cycle time. Further, when different size inserts are required when the thickness variation is large, such as when an over-flush condition occurs, this adds to inventory and manufacturing assembly time.

SUMMARY

In one form, an insert for use in a sandwich-type structure is provided, the sandwich-type structure including face sheets attached to a core. The insert comprises a plug having an outer flange, a central portion having a wall extending from the outer flange, the wall defining an exterior surface, and an aperture extending through the outer flange and the central portion. The insert also includes a sleeve configured for sliding engagement with the plug, the sleeve comprising an outer flange, a central portion defining an extension having a plurality of resilient beams, and an aperture extending through the outer flange and the central portion, the aperture of the sleeve being in communication with the aperture of the plug in an axial direction. When the sleeve is slid into engagement with the plug within the sandwich-type structure, the plurality of resilient beams are elastically deflected by the exterior surface of the wall of the plug such that the insert can be positioned properly in the axial direction to accommodate sandwich-type structures of varying thickness.

In a variation of the present disclosure, the plug includes a residual material removal feature. During installation, when the plug is repeatedly rotated clockwise and counter-clockwise, the residual material removal feature functions to remove residual materials from the sandwich-type structure for proper installation of the insert. In one form, the residual material removal feature is a textured surface on a sidewall of the outer flange of the plug. The sidewall may further be chamfered outwardly, and the textured surface may be evenly spaced serrations in one form of the present disclosure.

In still another variation, at least one of the outer flange of the plug and the outer flange of the sleeve comprises a recessed step. When the sleeve is slid into engagement with the plug within the sandwich-type structure, the plurality of resilient beams are elastically deflected by the exterior surface of the wall of the plug such that the insert can be positioned properly in the axial direction to accommodate sandwich-type structures of varying thickness and the recessed step is configured to engage an interior surface of at least one of the face sheets. In variations of this form, the at least one outer flange further comprises an inwardly tapering sidewall. In another form, the inwardly tapering sidewall defines a textured surface.

In another form, an insert for use in a sandwich-type structure is provided that includes an upper element comprising an outer flange, a central portion having a wall extending from the outer flange, the wall defining an exterior surface and an interior surface, and an aperture extending through the outer flange and the central portion. The insert further includes a lower element configured for sliding engagement with the upper element, the lower element comprising an outer flange, a central portion defining an extension having a plurality of resilient beams, and an aperture extending through the outer flange and the central portion, the aperture of the lower element being in communication with the aperture of the upper element in an axial direction. When the lower element is slid into engagement with the upper element within the sandwich-type structure, the plurality of resilient beams are elastically deflected by at least one of the exterior surface and the interior surface of the wall of the upper element such that the insert can be positioned properly in the axial direction to accommodate sandwich-type structures of varying thickness.

With the upper and lower elements of the insert, the resilient beams may be slid over the exterior surface of the wall of the upper element such that the resilient beams are deflected outwardly, or in another form, the resilient beams are slid against the interior surface of the wall of the upper element such that the resilient beams are deflected inwardly.

In one form, the lower element defines four (4) equally spaced resilient beams around a periphery of the central portion. Additionally, a structural assembly employing this insert is provided, which comprises a sandwich-type structure, the sandwich-type structure including face sheets attached to a core, wherein the insert is secured through the sandwich-type structure. In one form, the sandwich-type structure is honeycomb.

In still another form, a method of installing an insert through a sandwich-type structure is provided by:

(a) preparing an aperture that extends through the sandwich-type structure;

(b) placing an upper element through the aperture, the upper element comprising an outer flange, a central portion having a wall extending from the outer flange, the wall defining an exterior surface and an interior surface, and an aperture extending through the outer flange and the central portion, such that the outer flange of the upper element abuts one of the face sheets;

(c) placing a lower element through an opposite side of the sandwich-type structure and through the aperture, the lower element being configured for sliding engagement with the upper element, the lower element comprising an outer flange, a central portion defining an extension having a plurality of resilient beams, and an aperture extending through the outer flange and the central portion, the aperture of the lower element being in communication with the aperture of the upper element in an axial direction.

When the lower element is slid into engagement with the upper element within the sandwich-type structure, the plurality of resilient beams are elastically deflected by at least one of the exterior surface and the interior surface of the wall of the upper element until the outer flange of the insert abuts an opposing face sheet of the sandwich-type structure, and the insert can be positioned properly in the axial direction to accommodate sandwich-type structures of varying thickness.

In a variation of this method, further steps may be carried out as follows:

(d) repeatedly rotating the upper element clockwise and counterclockwise to clear residual materials; and (e) further pressing the upper element into the lower element.

In still another variation, an alternate step may be provided as:

(d) forcing one of the upper element and/or the lower element into sliding engagement with each other until the recessed step(s) engage(s) an interior surface of at least one of the face sheets, wherein when the lower/upper element is slid into engagement with the upper/lower element within the sandwich-type structure, the plurality of resilient beams are elastically deflected by at least one of the exterior surface and the interior surface of the wall of the upper element until the recessed step engages an interior surface of at least one of the face sheets, and the insert can be positioned properly in the axial direction to accommodate sandwich-type structures of varying thickness and can be secured with a potting compound without the use of an installation tab.

It should be noted that step (b) may be performed before step (c), or step (c) may be performed before step (b) while remaining within the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a side cross-sectional view of the insert being installed into a sandwich-type structure according to the teachings of the present disclosure;

FIG. 4B is a side view of the insert fully installed into the sandwich-type structure according to the teachings of the present disclosure;

Figure 1:
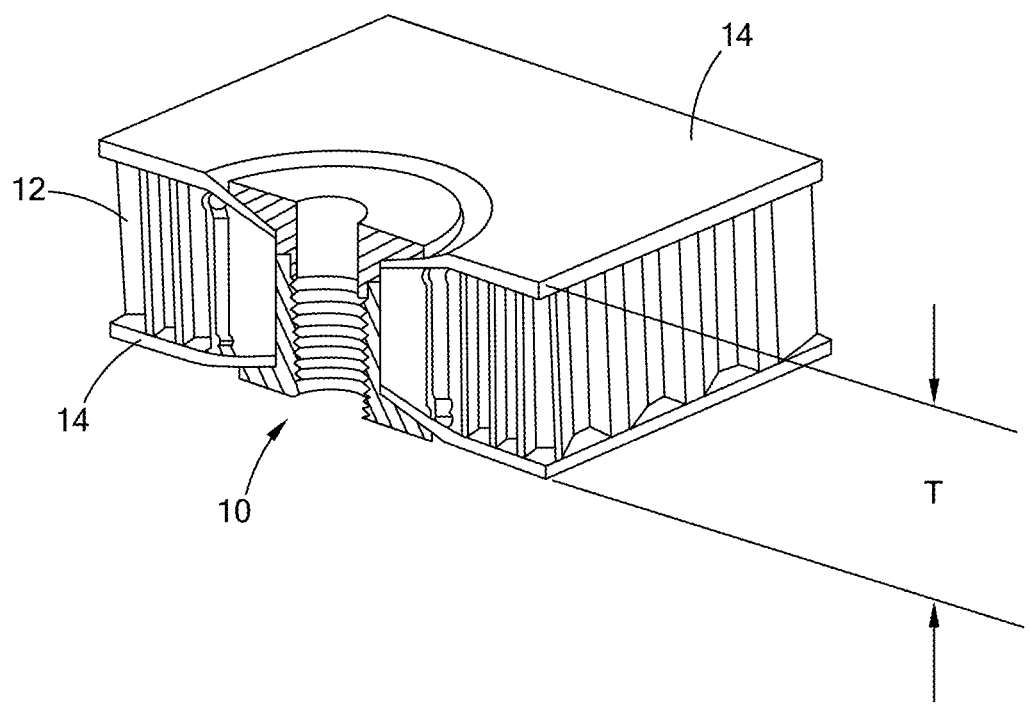
FIG. 1 is a cutaway perspective view of a prior art sandwich-type structure having an insert installed therein.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
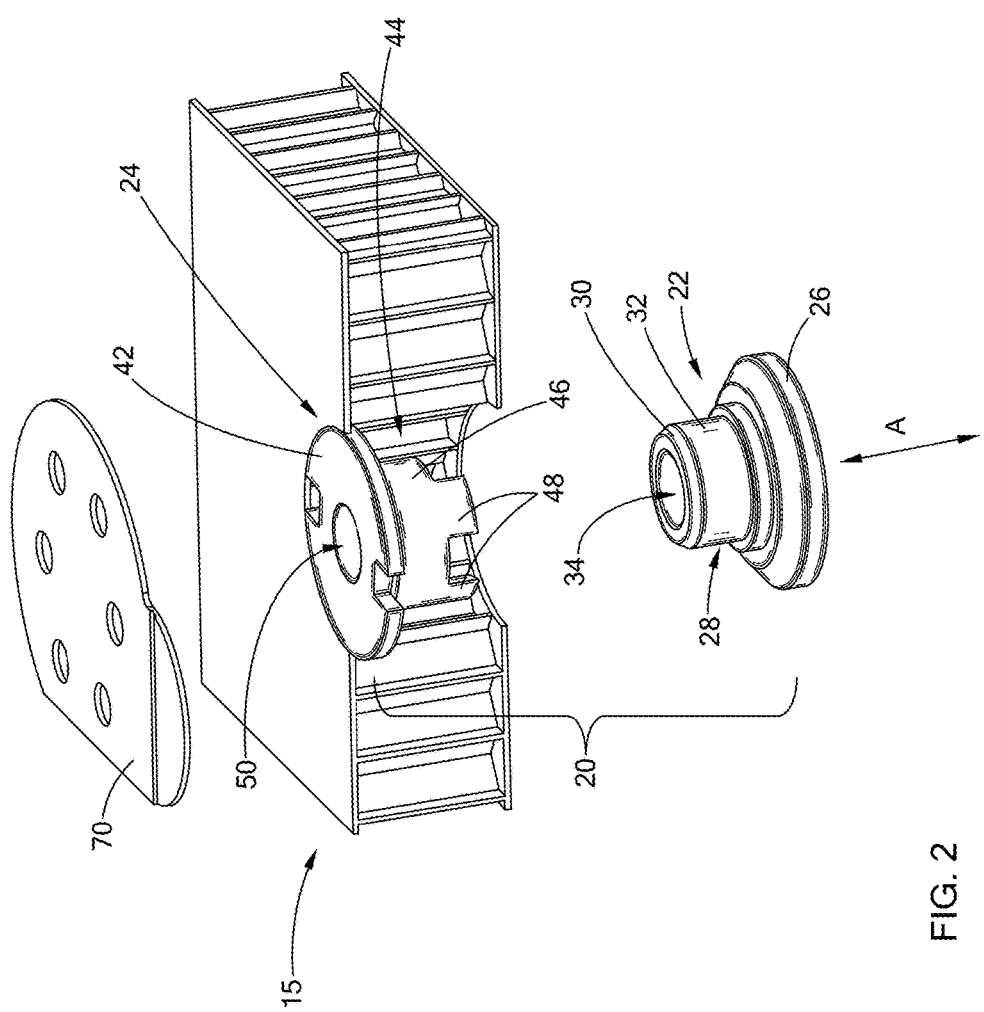
FIG. 2 is an exploded perspective view of a sandwich-type structure and one form of an insert constructed in accordance with the principles of the present disclosure.
Figure 3B:
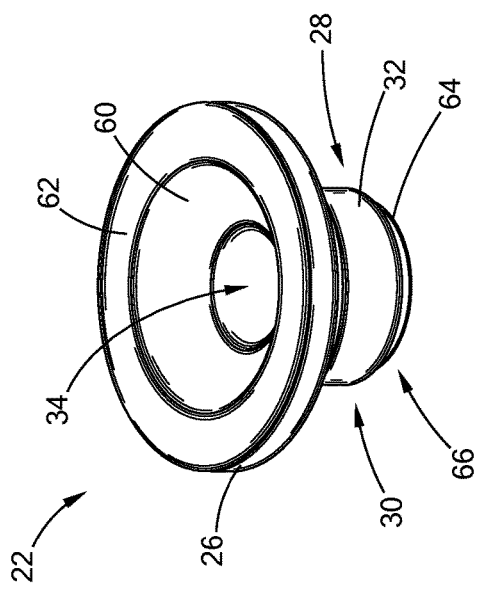
FIG. 3B is a perspective view of a plug constructed in accordance with the principles of the present disclosure.
Figure 3C:
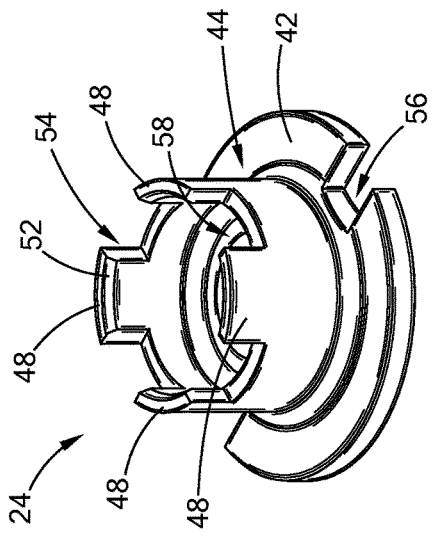
FIG. 3C is a perspective view of a sleeve constructed in accordance with the principles of the present disclosure.
Figure 3A:
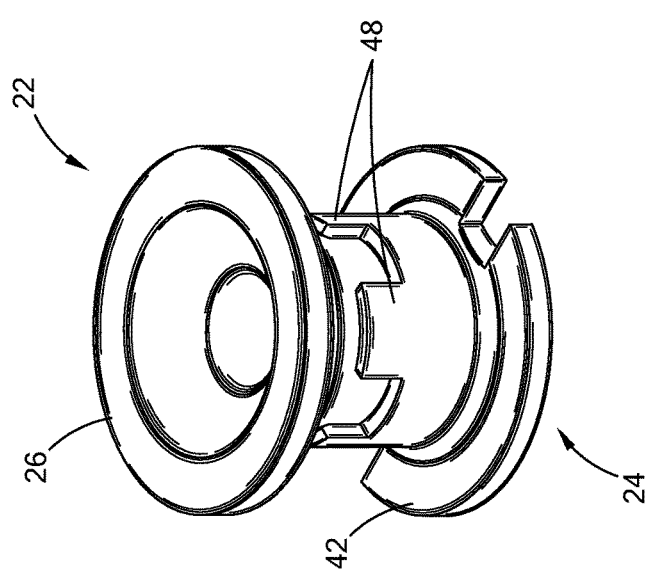
FIG. 3A is a perspective view of the insert of FIG. 2 constructed in accordance with the principles of the present disclosure.

Referring to FIGS. 2 and 3A 3B, an insert for use in a sandwich-type structure 15, or sandwich structure 15, (which is honeycomb as shown in one form of the present disclosure) is illustrated and generally indicated by reference numeral 20. The insert 20 in one form of the present disclosure is provided in two (2) pieces, namely, a plug 22 and a sleeve 24. As shown, the plug 22 comprises an outer flange 26 and a central portion 28 having a wall 30 extending from the outer flange 26. The wall 30 defines an exterior surface 32, which in this form is continuous and cylindrical in shape. It should be understood, however, that the wall 30 and its exterior surface 32 may take on a number of geometries, for example polygonal, B-surfaces, or combinations thereof, while remaining within the scope of the present disclosure. As further shown, an aperture 34 extends through the outer flange 26 and the central portion 28. The aperture 34 is adapted to receive a fastener or mating component (not shown) that is to be secured to the sandwich-type structure 15 as set forth above.

The insert 20 further comprises the sleeve 24 configured for sliding engagement with the plug 22. In one form, the sleeve 24 comprises an outer flange 42 and a central portion 44, and the central portion 44 defines an extension 46 having a plurality of resilient beams 48. Similar to the plug 22, the sleeve 24 also includes an aperture 50 (best shown in FIG. 2) extending through its outer flange 42 and the central portion 44. The sleeve aperture 50 is in communication with the plug aperture 34 in an axial direction A as shown.

In one form, the sleeve 24 defines four (4) equally spaced resilient beams 48 around a periphery of the central portion 44. (Best shown in FIG. 3C). The term "resilient" as used herein should be construed to mean elastically deflected, or capable of being deflected in a direction under load and then returning to its original nominal position upon removal of the load. Such resiliency will be better understood in the description that follows relative to installation of the insert 20.

Additionally, although four (4) equally spaced resilient beams 48 are illustrated and described herein, it should be understood that any number of resilient beams 48 (including only one) may be employed in accordance with the teachings of the present disclosure. The resilient beams 48 also need not be spaced equally or have the rectangular geometry as illustrated herein. And while the resilient beams 48 in one form are shown as having a constant thickness, variable thickness resilient beams 48 (not shown) may also be employed while remaining within the scope of the present disclosure. Such variable thickness beams would provide a tailored bending stiffness along the length of each beam in order to provide a requisite clamping force according to application requirements.

The resilient beams 48 in one form, as best shown in FIG. 3C, define internal chamfers 52 extending around their end portions 54 in order to provide for ease of insertion of the plug 22, which is described in greater detail below. Additionally, the sleeve outer flange 42 in one form comprises at least one radial recess 56, which is used to insert a potting compound upon final assembly of the insert 20 into the sandwich-type structure 15. Alternately, the radial recess 56 may be used for venting or other purposes. It should be understood that this radial recess 56 may be formed in either or both of the plug 22 or the sleeve 24 and may take on any number of geometries while remaining within the scope of the present disclosure. In another form, the radial recess 56 may be eliminated all together for an application where the insert 20 does not need to be potted into the sandwich-type structure 15. This is commonly referred to as a "non-potted" insert and is used, for example, when the sandwich-type structure 15 has a metallic core. The sleeve 24 also defines an internal cavity 58, into which the plug 22 is inserted as described in greater detail below.

The plug 22 in one form, as best shown in FIG. 3B, comprises a tapered recess 60 extending from an upper surface 62 of the plug outer flange 26 to the plug aperture 34. This recess 60 is incorporated in order to guide a fastener or adjacent component (not shown) having a counter-sunk head into the plug aperture 34 for attachment to the sandwich-type structure. Accordingly, the recess 60 may take on another configuration depending on the geometry of the fastener being installed therein, or may be omitted depending on the specific design requirements. In still another form, the plug wall 30 defines an external chamfer 64 extending around and end portion 66, which also provide for ease of insertion into the sleeve 24 as described in greater detail below.

The plug 22 and sleeve 24 in one form are a Titanium alloy such as when the sandwich-type structure is a phenolic honeycomb material and the face sheets are a carbon composite. In other forms, the plug 22 and sleeve 24 are an Aluminum alloy. The plug 22 and sleeve 24 are not limited to any specific material, and each may even be formed of a different material than the other. Therefore, the materials as described herein are merely exemplary and should not be construed as limiting the scope of the present disclosure.

Referring now to FIGS. 4A and 4B, installation of the insert 20 is now illustrated and described in greater detail. As shown, when the plug 22 is slid into engagement with the sleeve 24, or vice-versa, within the sandwich-type structure 15, the plurality of resilient beams 48 are elastically deflected outward by the exterior surface 32 of the wall 30 of the plug 22 such that the insert 20 can be positioned properly in the axial direction A to accommodate sandwich-type structures of varying thickness. As shown, in FIG. 4A, the plug 22 is pressed into the sleeve 24 until the plug outer flange 26 is flush with the upper face sheet 14.

Prior to insertion of the plug 22, however, the sleeve 24 is positioned onto the sandwich-type structure 15, for example by using an alignment tab 70 (which is also shown in FIG. 2). The alignment tab 70 includes an adhesive backing that is used to hold the sleeve 24 and press the sleeve outer flange 42 flush against the lower face sheet 14. After the sleeve 24 is properly positioned against the lower face sheet 14, the plug 22 is then inserted from an opposite side of the sandwich-type structure 15 as shown and to engage and deflect the resilient beams 48 as described above. It should be understood that although the illustrations show the sleeve 24 being positioned first against a face sheet 14 and then the plug 22 inserted therein, the present disclosure also contemplates first positioning the plug 22 and its plug outer flange 26 flush with a face sheet 14, and then inserting the sleeve 24 and its resilient beams 48 around the exterior surface 32 of the wall 30 of the plug until the sleeve outer flange 42 is also flush against the opposing face sheet 14.

In either case, as the resilient beams 48 deflect, a variety of thicknesses of the sandwich-type structure 15 can be accommodated with a single insert 20, and within the confines of the specific geometry/properties of the features of the plug 22 and sleeve 24. For example, such specific geometries/properties include, the length and stiffness of the resilient beams 48, and the length of the wall 30 of the plug 22. In one form, the resilient beams 48 are configured to provide a variable squeeze force (against the wall 30 of the plug 22) between approximately 5 and approximately 30 pounds for a manual, e.g. thumb, installation.

It should also be understood the terms "plug" and "sleeve" should not be construed as limiting the geometry of the insert 20. Accordingly, in another form, the insert 20 may instead include an "upper element" and a "lower element" that may have an alternate adjustable geometric engagement other than the plug/socket configuration as illustrated and described herein. For example, a corresponding wall of the upper element may have a variable thickness slot located therein, while the resilient beams 48 of the lower element are inserted within the slot, thus deflecting one or more walls of the upper element.

Figure 5:
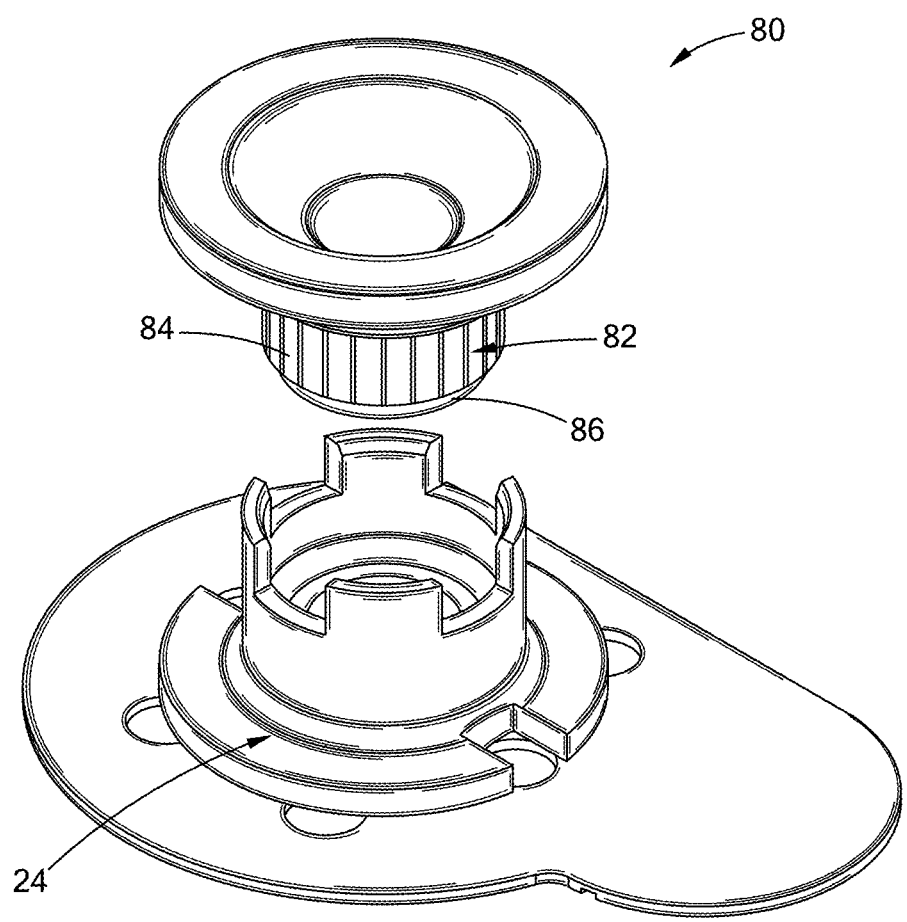
FIG. 5 is a perspective view of an alternate form of a plug/upper element for the insert constructed in accordance with the principles of the present disclosure.

Referring to FIG. 5, an alternate form of the plug/upper element is illustrated and generally indicated by reference numeral 80. As shown, the plug 80 includes surface texturing 82 on the exterior surface 84 of the wall 86. Generally, the surface texturing 82 functions to provide improved grip/adjustability within the sleeve 24 and further aids in the assembly of the insert. Additionally, the surface texturing 82 provides an assembly retention feature during injection of the potting compound at certain pressures. The surface texturing 82 in this exemplary form defines axial grooves, however, it should be understood that any number of surface texture geometries/patterns may be employed while remaining within the scope of the present disclosure.

Figure 6:
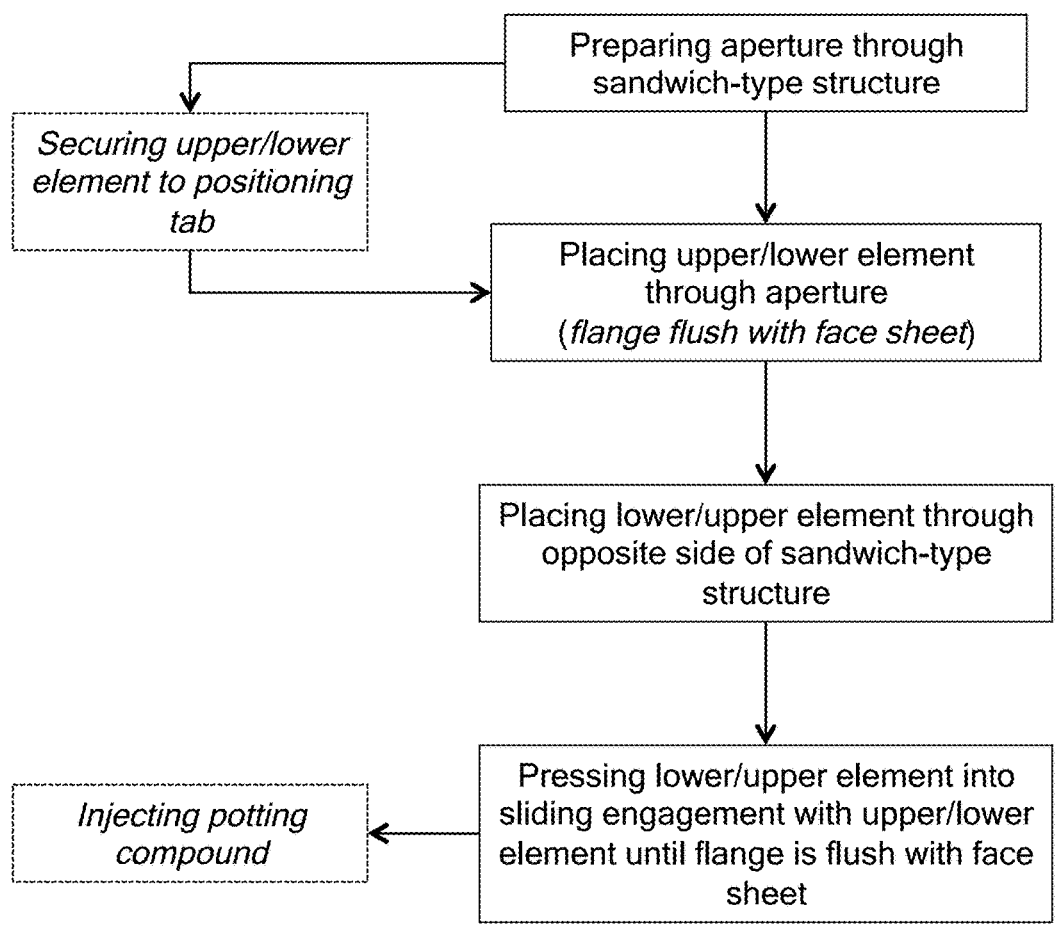
FIG. 6 is a flow diagram illustrating a method of installing the insert through a sandwich-type structure in accordance with the teachings of the present disclosure.
Figure 7:
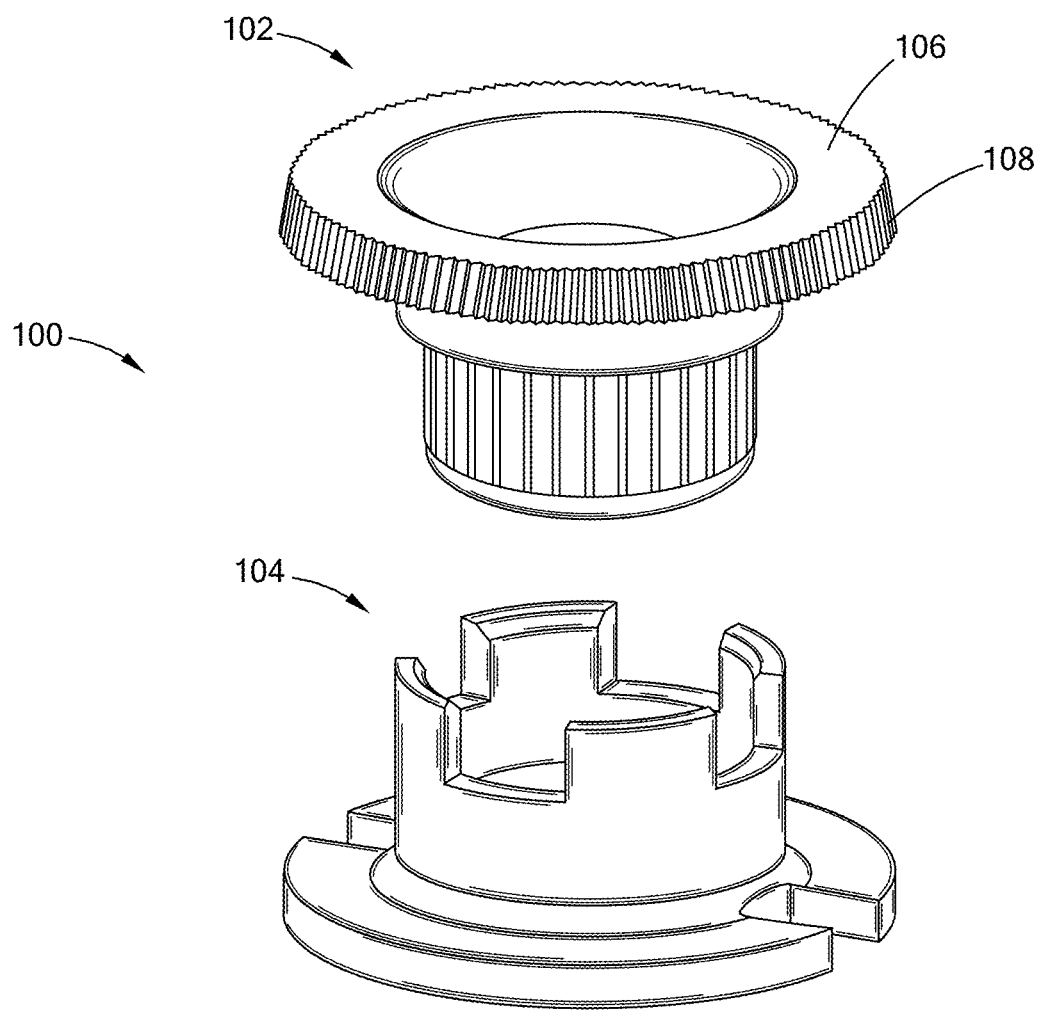
FIG. 7 is an exploded perspective view of another form of the present disclosure having a debris/residual material removal feature constructed in accordance with the principles of the present disclosure.

With reference now to FIG. 6, a method of installing the insert 20 through the sandwich-type structure 15 according to the present disclosure is illustrated in a flow diagram. The method comprises the steps of:

(a) preparing an aperture that extends through the sandwich-type structure;

(b) placing the upper element/plug 22 (as illustrated and described above) through the aperture until its outer flange is flush with a face sheet;

(c) placing the lower element/sleeve 24 (as illustrated and described above) through an opposite side of the sandwich-type structure 15 and through the aperture; and (d) forcing one of the upper element and/or the lower element into sliding engagement with each other until its outer flange is flush with an opposing face sheet, wherein when the lower/upper element is slid into engagement with the upper/lower element within the sandwich-type structure, the plurality of resilient beams are elastically deflected by at least one of the exterior surface and the interior surface of the wall of the upper element until the outer flange of the insert abuts an opposing face sheet of the sandwich-type structure, and the insert can be positioned properly in the axial direction to accommodate sandwich-type structures of varying thickness.

As set forth above, step (c) may be performed before step (b). Additionally, as an optional step, a potting compound may be injected through at least one radial recess formed in one of the outer flanges of the sleeve and the plug as described above.

Accordingly, this form of the present disclosure provides an insert that is adjustable in order to accommodate thickness variations in sandwich-type structures, thus providing for more efficient assembly operations and reduced inventory when compared to standard inserts in the art. It should be understood that the insert according to the present disclosure is not limited to use in sandwich-type structures and thus may be used in any type of panel or structure while remaining within the scope of the present disclosure.

Referring now to FIGS. 7 through 10, another form of an insert having a debris/residual material removal feature is illustrated and generally indicated by reference numeral 100. As shown, the insert 100 includes a plug 102 and a sleeve 104. Similar to previous forms, the plug 102 includes features as previously set forth (which will not be repeated for purposes of clarity), and in this form, the outer flange 106 includes a feature for removing debris or residual materials from the sandwich-type structure (not shown) prior to final installation. Many core materials, such as honeycomb cores, are a paper material form reinforced with a resin, for example a Kevlar® fabric reinforced with a high temperature resistant phenolic resin. When drilling through these core materials, and also the face sheets 14, residual material, such as fabric strands, often remains, which can inhibit proper installation of the insert 100. In this form, the residual material removal feature comprises a textured surface along a sidewall 108 of the outer flange 106. When the plug 102 is inserted, it can also be rotated, and the textured surface along the sidewall 108 of the outer flange 106 removes the residual material. The textured surface in this form is a plurality of evenly spaced serrations as shown, although it should be understood that other types of texturing may be used while remaining within the scope of the present disclosure.

Figure 9:
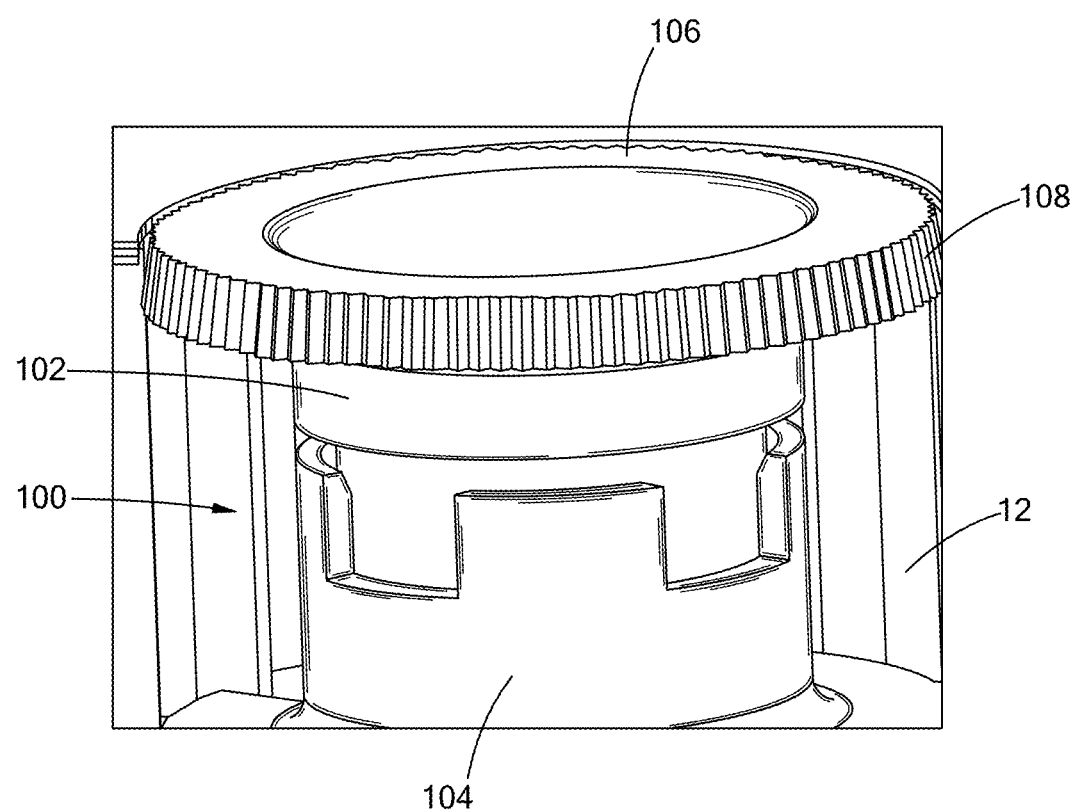
FIG. 9 is an enlarged perspective view of one form of the residual material removal feature on a plug and constructed in accordance with the principles of the present disclosure.
Figure 10:
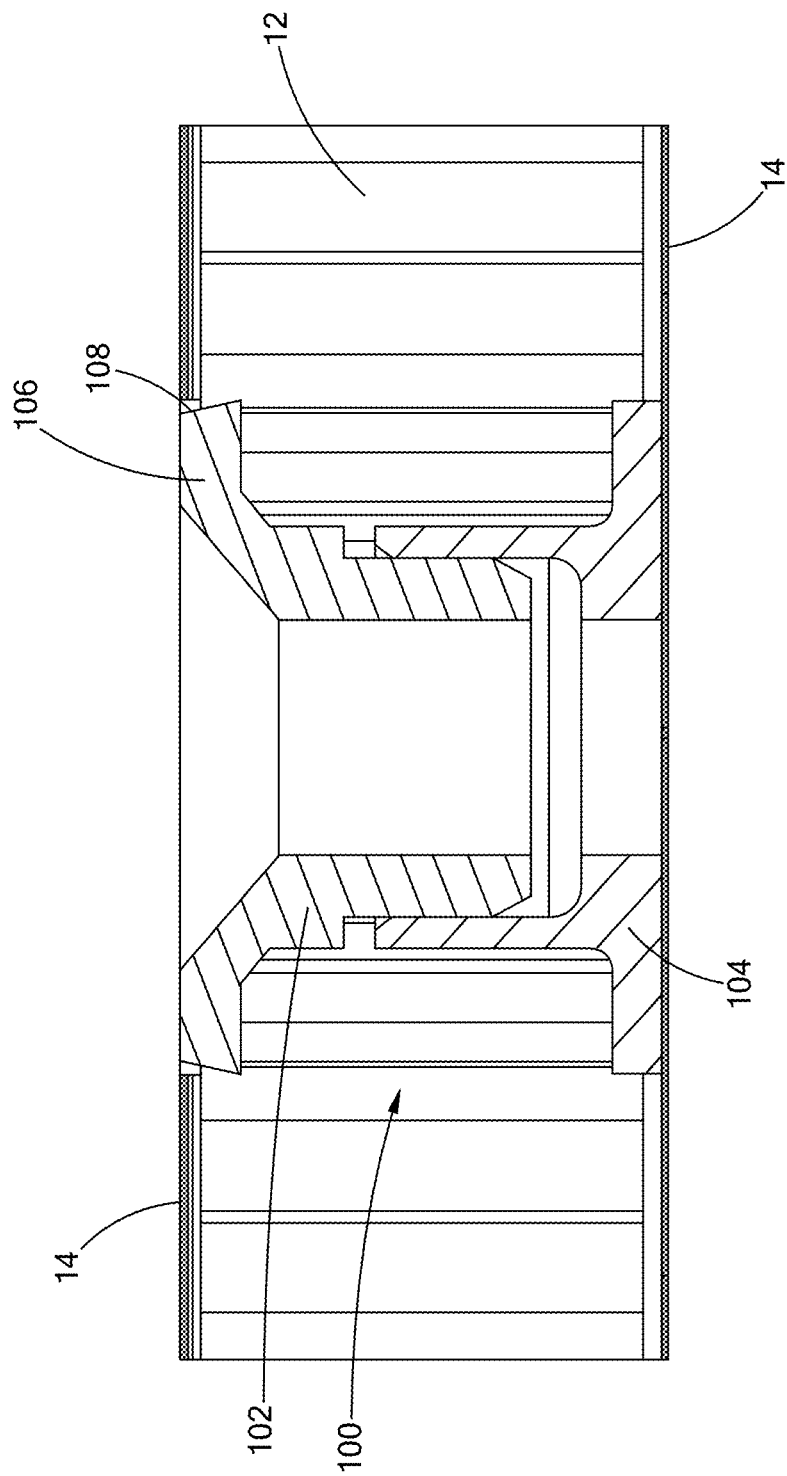
FIG. 10 is a cross-sectional view of the plug and sleeve of FIG. 7 installed within a sandwich-type structure in accordance with the principles of the present disclosure.
Figure 11:
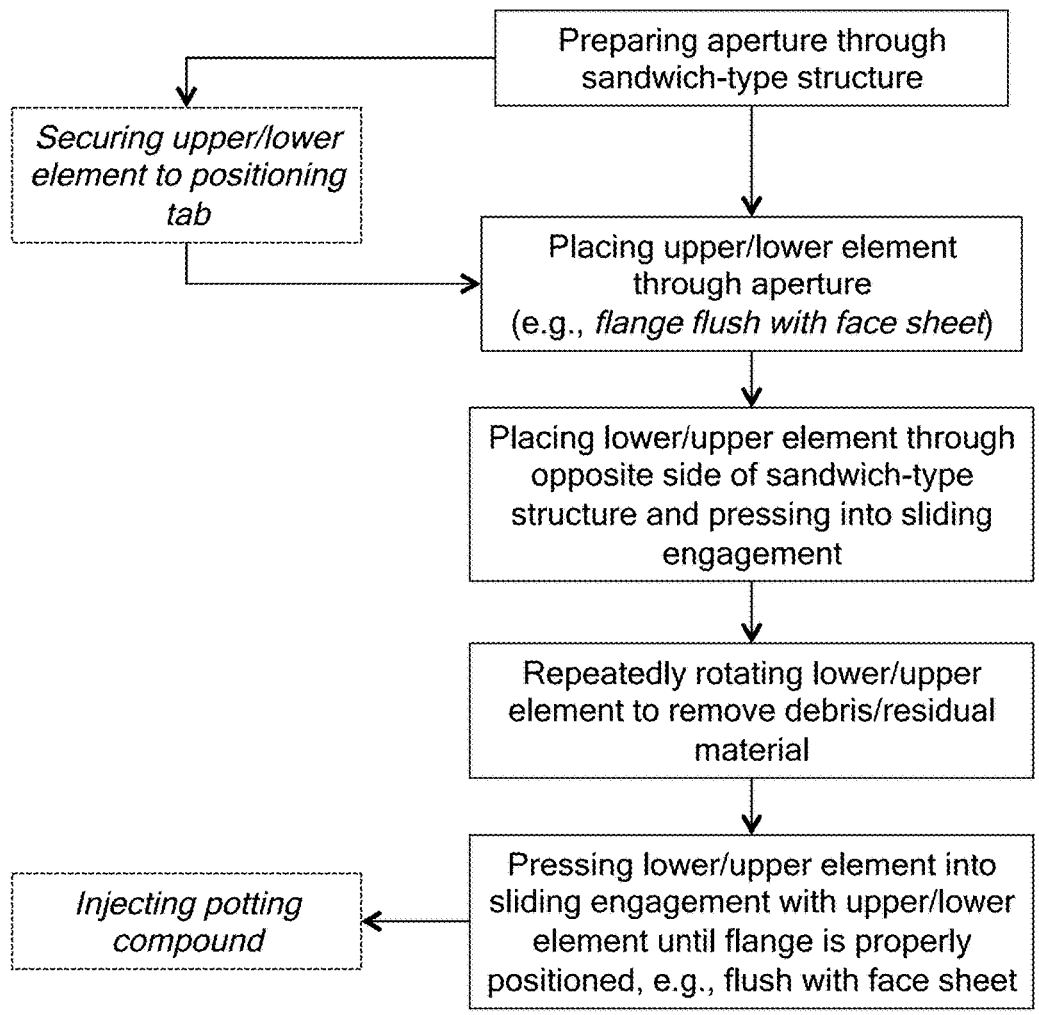
FIG. 11 is a flow diagram illustrating a method of installing the insert of FIG. 7 through a sandwich-type structure in accordance with the teachings of the present disclosure.

As better shown in FIGS. 9 and 10, the sidewall 108 of the flange 106 in one form is chamfered outwardly from a top surface of the flange 106 as shown. Accordingly, the residual material removal feature, and in this case the chamfered sidewall with serrations, functions to remove debris/residual materials from the sandwich-type structure by repeatedly rotating the plug 102 once it is disposed within the sleeve 104. The residual material removal feature thus engages any debris, such as loose fibers, and removes them prior to final installation of the insert 100, thus providing for proper positioning of the insert 100, for example, being flush with both face sheets 14 of the sandwich-type structure 15 (FIG. 10). Additionally, the residual material removal feature further serves to hold the insert 100 in place by a variable friction fit, or gripping, until being permanently potted or bonded in place.

It should be understood that the plug 102 and sleeve 104 may further be referred to as an upper element and lower element, interchangeably, as set forth above.

Referring now to FIGS. 8-11, the insert 100 may be in a pre-set configuration within the sandwich-type structure 15, with the alignment tab 70 optionally used for installation. After the plug 102 is set within the sleeve 104, the plug 102 is then repeatedly rotated, allowing the residual material removal feature to clear any debris (e.g., loose fibers) impeding the plug 102 from achieving a proper installation (e.g., flush). Once all or most of the debris is cleared, the plug 102 is then pressed further into the sleeve 104 to achieve the proper installation.

Figure 8:
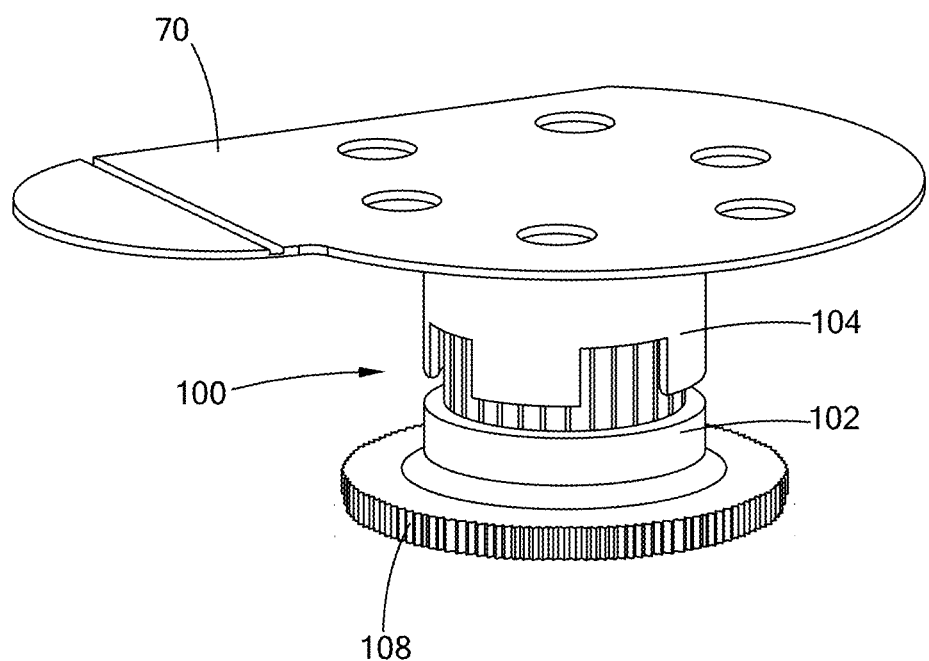
FIG. 8 is a perspective view of the plug and sleeve of FIG. 7 being installed (sandwich-type structure not shown for clarity) with a tab in accordance with the principles of the present disclosure.

In one form, there may be a static pre-set configured length of the insert 100 as shown in FIG. 8, and the plug 102 is translated an additional 0.030 inches further after the debris is removed. In another form, the plug 102 and/or sleeve 104 may include coating or plating to certain surfaces for an improved installation/fit.

Figure 12:
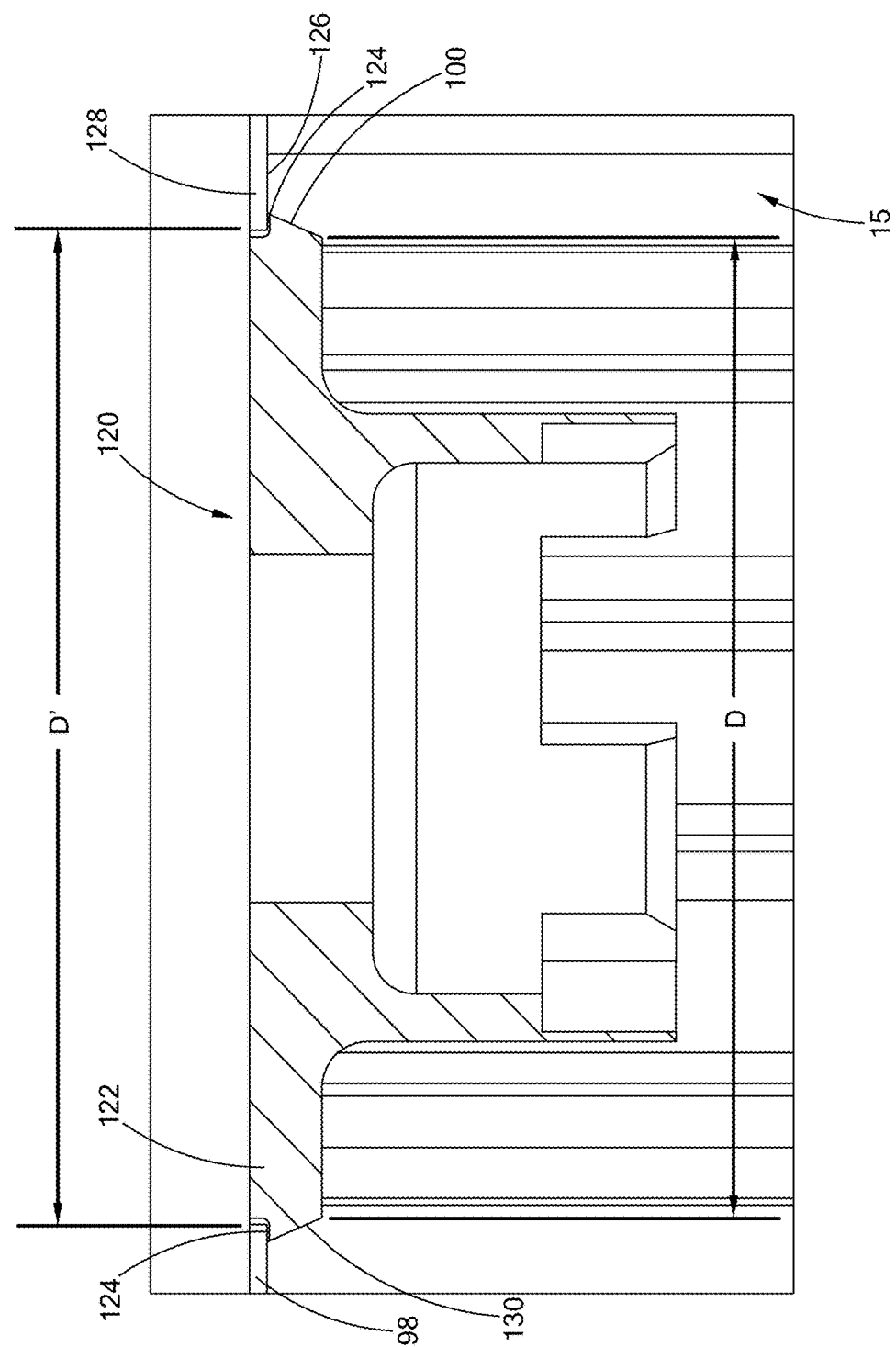
FIG. 12 is a side cross-sectional view of an alternate sleeve for an insert having a recessed step constructed in accordance with the teachings of the present disclosure.

Referring now to FIG. 12, another alternate form of the present disclosure is provided that is configured to be installed without the use of a tab 70 as previously set forth in FIGS. 2 and 5. As shown, a sleeve 120 comprises an outer flange 122 having a recessed step 124, which is configured to engage an interior surface 126 of at least one of the face sheets 128 of the sandwich-type structure 15. Although a sleeve 120 is shown, it should be understood that the inventive recessed step 124 may be employed in either or both of the plug and the sleeve (or upper/lower elements) as described and illustrated above while remaining within the scope of the present disclosure. It should also be understood that the feature of a recessed step 124 may also be combined with additional features described and illustrated herein while remaining within the scope of the present disclosure.

As further shown, the outer flange 122 further comprises an inwardly tapering sidewall 130 in order to facilitate insertion of the sleeve 120. More specifically, the dimension D at the bottom of the sidewall 130 is smaller than the dimension D' of the aperture in the sandwich-type structure 15. Accordingly, the sleeve 120 may be inserted through the aperture until the recessed step 124 engages or snaps against the interior surface 126 of the face sheet 128. During this installation, the face sheet 128 elastically deforms to accommodate the upper portion of the inwardly tapering sidewall 130 and then rests on the recessed step 124 as shown. After the potting compound is injected through the sleeve 120 (see, e.g., radial recess 56 in FIG. 3C), the expanding/curing potting compound and any off-gassing will force the recessed step 124 against the interior surface 126 of the face sheet 128, which maintains the sleeve 120 in its proper position. Therefore, the use of a tab 70 may be eliminated with this alternate configuration of the present disclosure. In some installations, the potting compound may be eliminated, as set forth herein, and thus the step of injecting the potting compound is optional.

Figure 13:
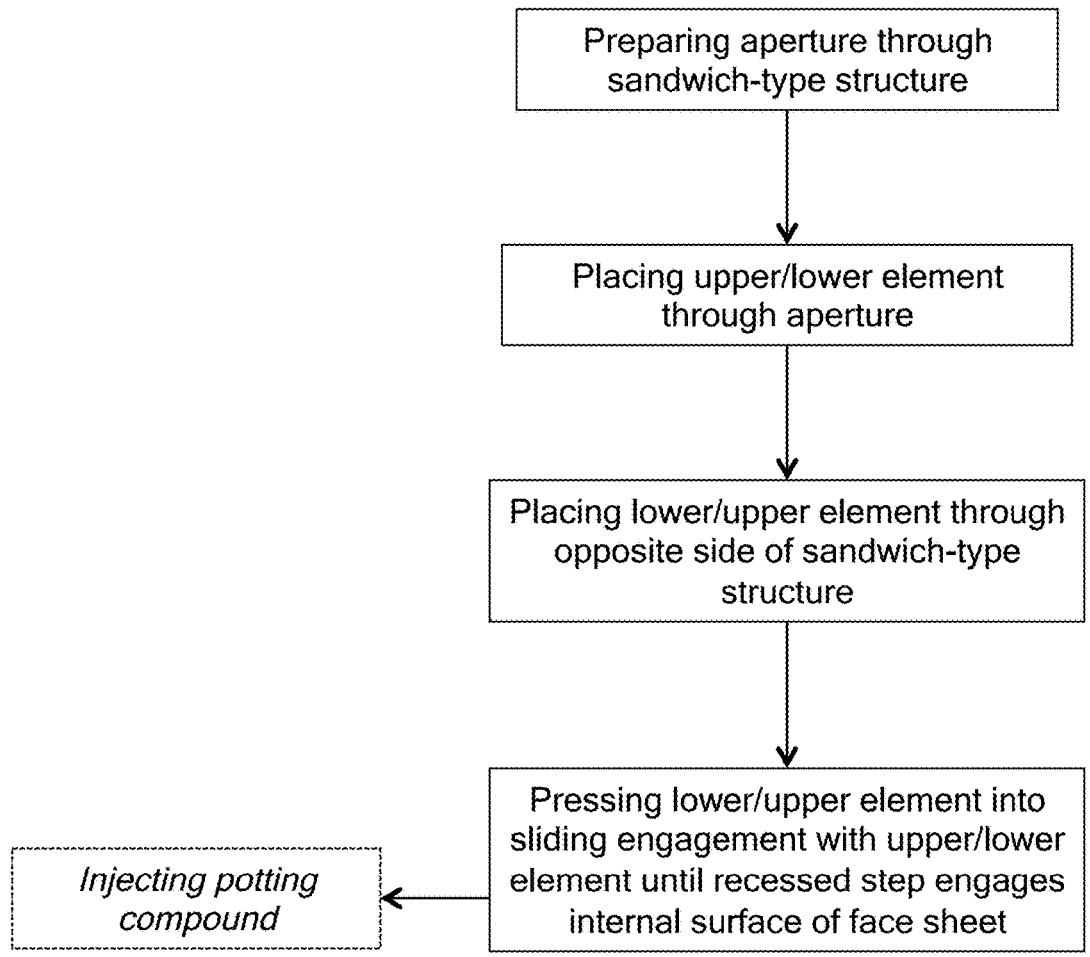
FIG. 13 is a flow diagram illustrating a method of installing the insert through a sandwich-type structure in accordance with the teachings of the present disclosure.

With reference now to FIG. 13, a method of installing the insert 120 of FIG. 12 through the sandwich-type structure 15 according to the present disclosure is illustrated in a flow diagram. The method comprises the steps of:

(a) preparing an aperture that extends through the sandwich-type structure;

(b) placing the upper element/plug 120 through the aperture;

(c) placing the lower element/sleeve 24 (as illustrated and described above) through an opposite side of the sandwich-type structure 15 and through the aperture; and (d) forcing one of the upper element and/or the lower element into sliding engagement with each other until the recessed step(s) engage(s) an interior surface of at least one of the face sheets, wherein when the lower/upper element is slid into engagement with the upper/lower element within the sandwich-type structure, the plurality of resilient beams are elastically deflected by at least one of the exterior surface and the interior surface of the wall of the upper element until the recessed step engages an interior surface of at least one of the face sheets, and the insert can be positioned properly in the axial direction to accommodate sandwich-type structures of varying thickness and can be secured with a potting compound without the use of an installation tab.

As set forth above, step (c) may be performed before step (b). Additionally, a potting compound may be injected through at least one radial recess formed in one of the outer flanges of the sleeve and the plug as described above.

Accordingly, this form of the present disclosure provides an insert that is both adjustable and self-locking such that an installation tab is not needed. The adjustability accommodates thickness variations in sandwich-type structures, and the recessed step(s) is configured to engage an interior surface of a face sheet during curing of the potting compound, thus providing for more efficient assembly operations and reduced inventory when compared to standard inserts and installation tabs in the art.

Figure 14:
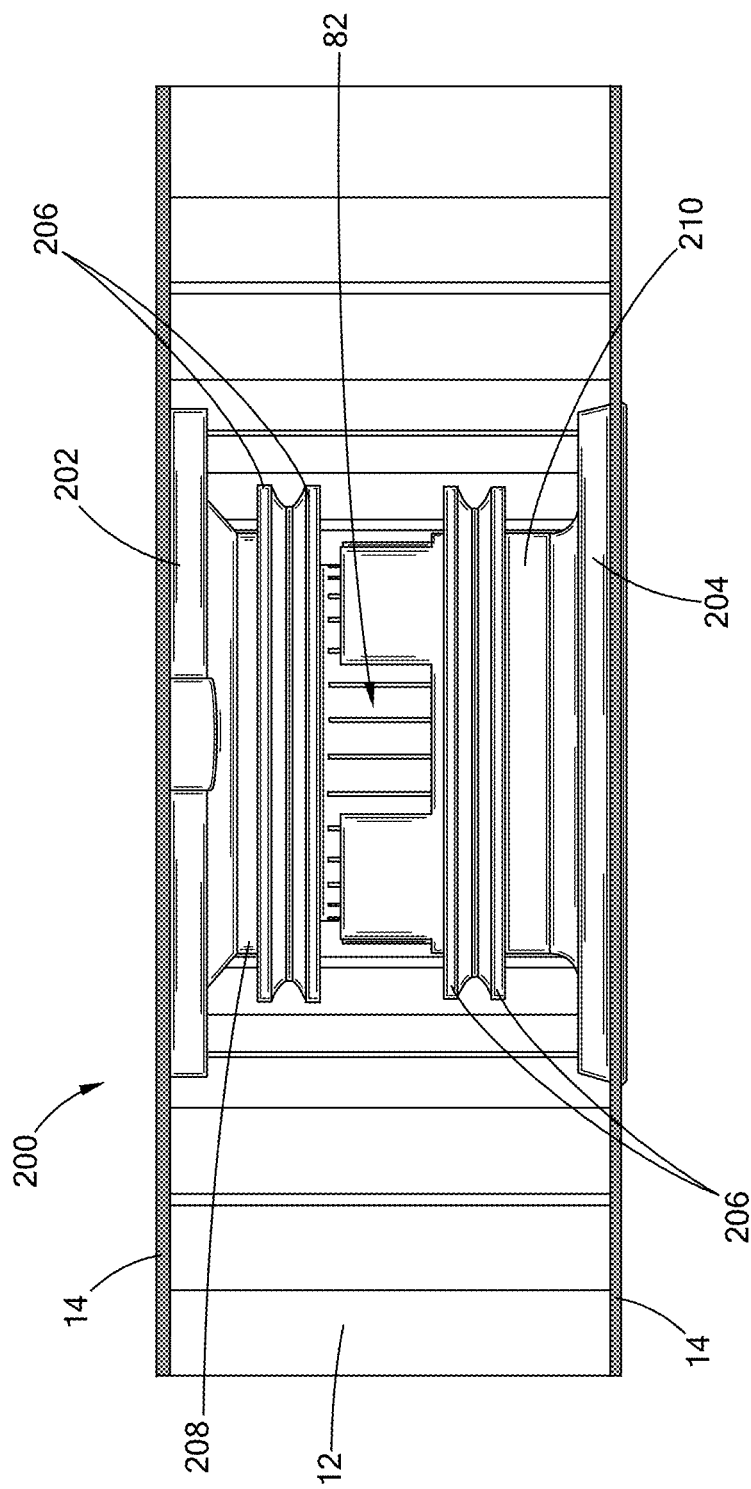
FIG. 14 is a side view of another form of an insert having debris/residual material removal features constructed in accordance with the principles of the present disclosure.
Figure 15:
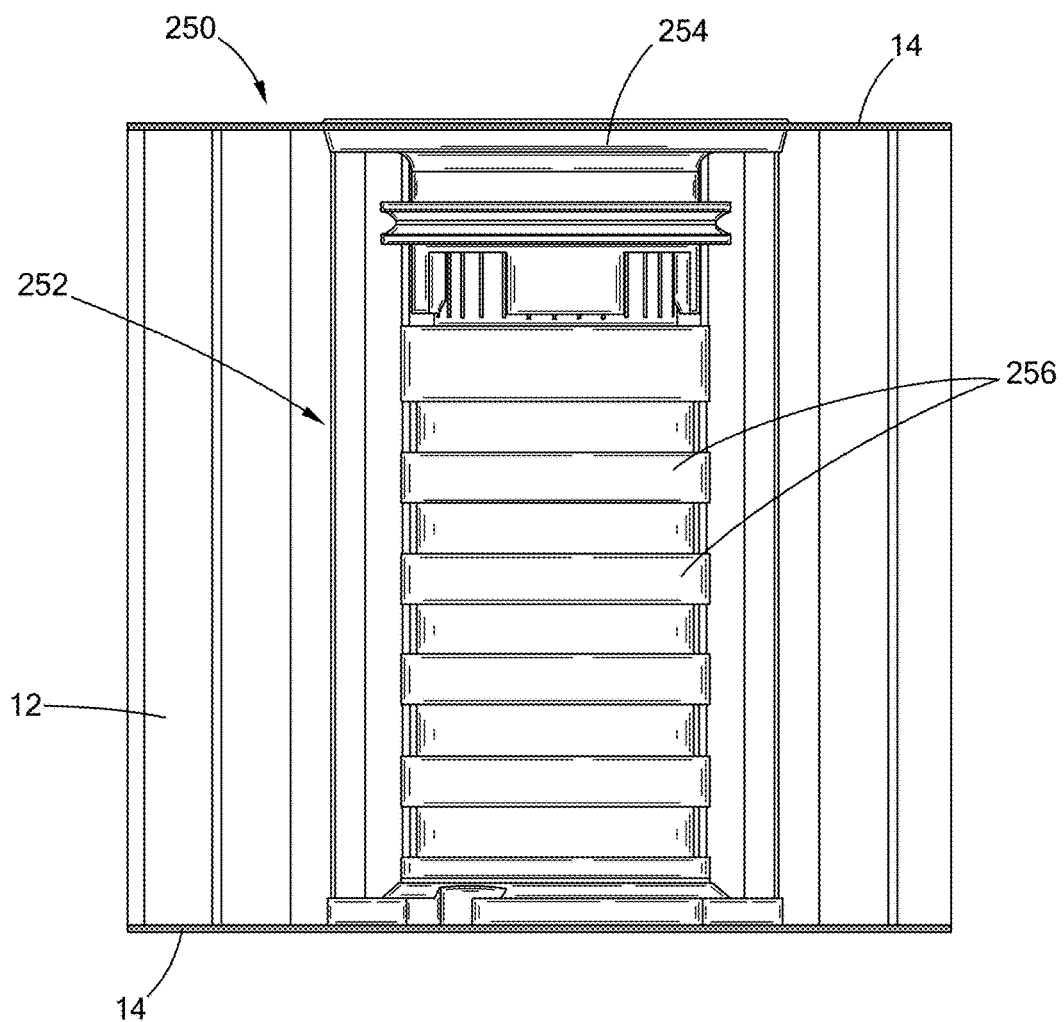
FIG. 15 is a side view of yet another form of an insert having debris/residual material removal features constructed in accordance with the principles of the present disclosure.
Figure 16:
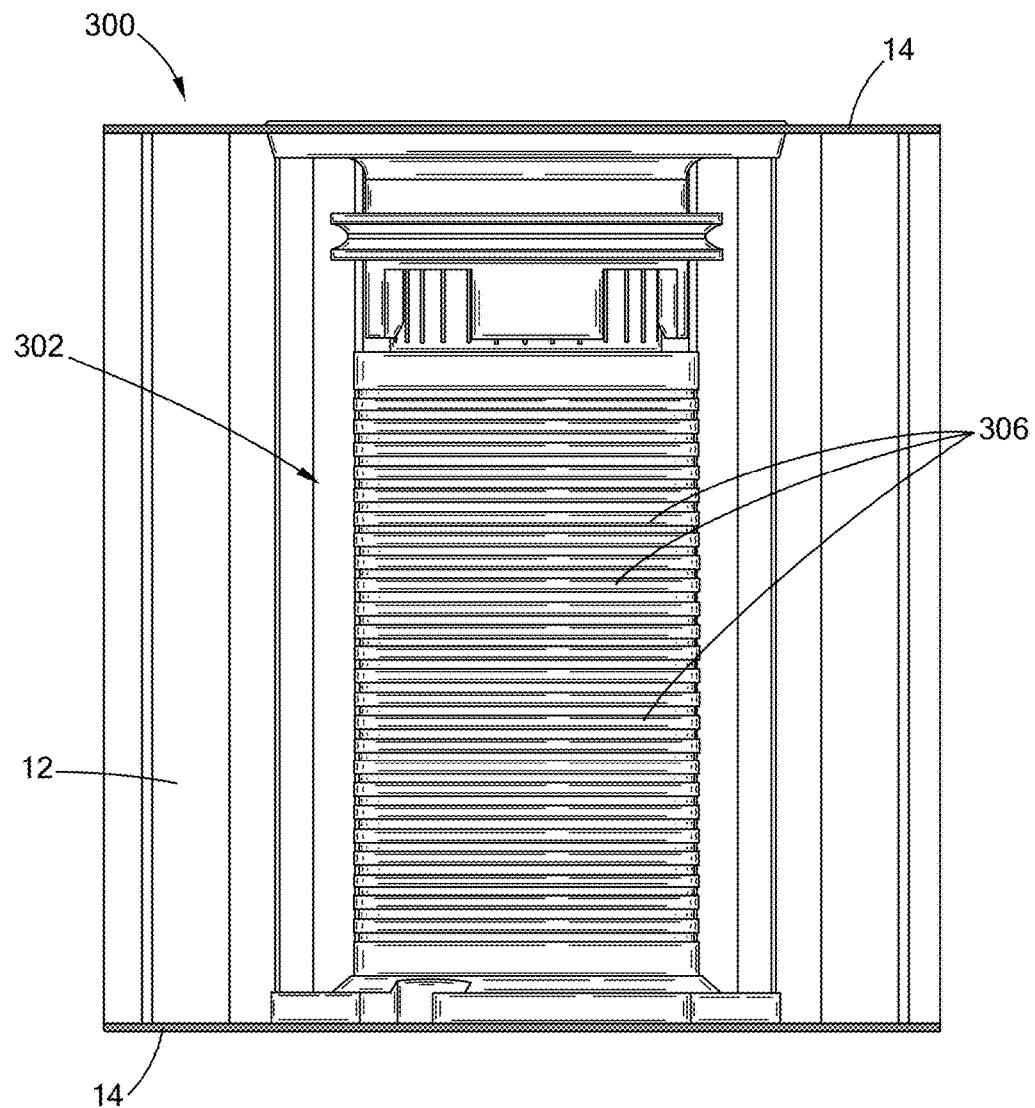
FIG. 16 is a side view of still another form of an insert having debris/residual material removal features constructed in accordance with the principles of the present disclosure.

Referring now to FIGS. 14-16, additional forms of the residual material removal feature previously described in connection with FIGS. 7-11 are illustrated and now described in greater detail.

As shown in FIG. 14, an insert 200 includes a plug 202 and a sleeve 204. Both the plug 202 and the sleeve 204 include a residual material removal feature in the form of circumferential rings 206. As shown, the plug 202 includes two circumferential rings 206, and the sleeve 204 includes two circumferential rings 206, both of which extend radially outward from their respective walls 208, 210. With these radially extending circumferential rings 206, as each of the plug 202 and the sleeve 204 are inserted through the face sheets 14 and the core 12 during installation, the circumferential rings 206 are configured to remove residual material as they extend outwardly from the walls 208, 210. It should be understood that only one circumferential ring 206 may be employed, and the ring(s) 206 may be disposed on one or both of the plug 202 and the sleeve 204 while remaining within the scope of the present disclosure. The circumferential rings 206 may be continuous or discontinuous around a periphery of the walls 208, 210. Additionally, other features of the plug and sleeve as disclosed herein may also be employed alone or in combination with this insert 200 while remaining within the scope of the present disclosure, for example, the surface texturing 82 on the plug 202 as shown in FIG. 14.

Referring now to FIG. 15, an insert 250 includes a plug 252 and a sleeve 254, wherein the plug 252 includes a residual material removal feature in the form of circumferential ridges 256. In this form, there are five (5) circumferential ridges 256 that may be of the same size, or of different sizes. The circumferential ridges 256 are configured to remove residual material because they extend outwardly from the wall 258 of the sleeve. The circumferential ridges 256 may be employed on either or both of the plug 252 and the sleeve 254, and thus the illustration of circumferential ridges 256 on the sleeve 254 should not be construed as limiting the scope of the present disclosure. Further, the circumferential ridges 256 may be formed at an angle relative to the wall 258 (not shown) rather than the normal configuration as shown, for example, in a spiral or helical configuration. Such variations of a residual material removal feature that extends radially from a wall of the plug and/or the sleeve should not be construed as limiting the scope of the present disclosure.

As shown in FIG. 16, such a variation of the circumferential ridges is illustrated on the plug 302 of an insert 300. The circumferential ridges 306 are smaller and greater in number than those in FIG. 15, and thus these circumferential ridges 306 are capable of removing smaller remnants of material from the core 12 and/or the face sheet 14. As set forth above, the number, geometry, and placement of the residual material removal features may be varied while remaining within the scope of the present disclosure. Further, these residual material removal features may be formed integrally with the plugs/sleeves as illustrated herein, or they may be separate components that are a part of the overall insert while remaining within the scope of the present disclosure.

The description of the disclosure is merely exemplary in nature and, thus, variations that do not depart from the substance of the disclosure are intended to be within the scope of the disclosure. It should be understood that all forms of the plug/sleeve or upper element/lower element and their features have been engineered to generate a moderate to excessive press fit, as required, in order to retain a desired insert configuration so that a subsequent epoxy/adhesive/potting compound may be used to permanently bond the components in place. It should also be understood that the various features illustrated and described herein may be provided alone or in any combination while remaining within the scope of the present disclosure. Such variations not to be regarded as a departure from the spirit and scope of the disclosure.

What is claimed is:

1. An insert for use in a sandwich structure, the sandwich structure including face sheets attached to a core, the insert comprising:
   a plug comprising:
      an outer flange;
      a central portion having a wall extending from the outer flange, the wall defining an exterior surface; and
      an aperture extending through the outer flange and the central portion; and
   a sleeve configured for sliding engagement with the plug, the sleeve comprising:
      an outer flange;
      a central portion defining an extension having a plurality of resilient beams; and
      an aperture extending through the outer flange and the central portion, the aperture of the sleeve being in communication with the aperture of the plug in an axial direction,
   wherein when the sleeve is slid into engagement with the plug within the sandwich structure, the plurality of resilient beams are elastically deflected by the exterior surface of the wall of the plug such that the insert can be positioned properly in the axial direction to accommodate sandwich structures of varying thickness.

2. The insert according to claim 1, wherein the sleeve defines four (4) equally spaced resilient beams around a periphery of the central portion.

3. The insert according to claim 1, wherein the resilient beams define internal chamfers extending around their end portions.

4. The insert according to claim 1, wherein the resilient beams are configured to provide a variable squeeze force between approximately 5 and approximately 30 pounds for a manual installation.

5. The insert according to claim 1, wherein the plug defines a tapered recess extending from an upper surface of the outer flange to the aperture.

6. The insert according to claim 1, wherein the wall of the plug defines an external chamfer extending around an end portion thereof.

7. The insert according to claim 1, wherein the exterior surface of the wall of the plug includes surface texturing.

8. The insert according to claim 1, wherein the plug further comprises a residual material removal feature, the residual material removal feature configured such that when the plug is repeatedly rotated clockwise and counterclockwise, the residual material removal feature functions to remove residual materials from the sandwich structure for proper installation of the insert.

9. The insert according to claim 8, wherein the outer flange of the plug defines a sidewall, the sidewall having a textured surface as the residual material removal feature.

10. The insert according to claim 1 wherein at least one of the outer flange of the plug and the outer flange of the sleeve comprises a recessed step configured to engage an interior surface of at least one of the face sheets after the sleeve is slid into engagement with the plug.

11. The insert according to claim 1, wherein the at least one outer flange further comprises an inwardly tapering sidewall.

12. An insert for use in a sandwich structure, the sandwich structure including face sheets attached to a core, the insert comprising:
   an upper element comprising:
      an outer flange;
      a central portion having a wall extending from the outer flange, the wall defining an exterior surface and an interior surface; and
      an aperture extending through the outer flange and the central portion; and
   a lower element configured for sliding engagement with the upper element, the lower element comprising:
      an outer flange;
      a central portion defining an extension having a plurality of resilient beams; and
      an aperture extending through the outer flange and the central portion, the aperture of the lower element being in communication with the aperture of the upper element in an axial direction,
   wherein when the lower element is slid into engagement with the upper element within the sandwich structure, the plurality of resilient beams are elastically deflected by at least one of the exterior surface and the interior surface of the wall of the upper element such that the insert can be positioned properly in the axial direction to accommodate sandwich structures of varying thickness.

13. The insert according to claim 12, wherein the resilient beams are slid over the exterior surface of the wall of the upper element such that the resilient beams are deflected outwardly.

14. The insert according to claim 12, wherein the resilient beams are slid against the interior surface of the wall of the upper element such that the resilient beams are deflected inwardly.

15. The insert according to claim 12, wherein the exterior surface of the wall of the upper element includes surface texturing.

16. The insert according to claim 12, wherein the upper element and the lower element define different materials.

17. The insert according to claim 12, wherein the resilient beams define a rectangular configuration.

18. The insert according to claim 12, wherein the resilient beams define a constant thickness.

19. The insert according to claim 12, wherein at least one of the outer flanges comprises at least one radial recess.

20. A structural assembly comprising:
   a sandwich structure, the sandwich structure including face sheets attached to a core; and
   an insert according to claim 12 secured through the sandwich structure.

* * * * *